Patented Sept. 5, 1950

2,521,544

UNITED STATES PATENT OFFICE 2,521,544

IODINATING AMINO PYRIMIDINES AND AMINO PYRIDINES

Robert Gordon Shepherd, Stamford, Conn., assignor to American Cyanamid Company, New York, N. Y., a corporation of Maine No Drawing. Application July 13, 1946, Serial No. 683,433

6 Claims. (Cl. 260—251)

This invention relates to new chemical compounds and a method of preparation, by which both they and certain previously known compounds may be produced. More particularly it is a method by which compounds containing amino pyridine and amino pyrimidine nuclei may be substituted in the 5 position by iodine by the use of mercuric acetate. Compounds made in accordance with this invention may be designated by the formula

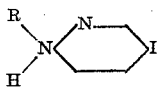

and the corresponding 3,5 di-iodinated compounds and

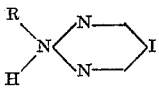

where R is H, or an aliphatic, or aliphatic sulfonyl, or aromatic sulfonyl group in which other substituents may be present, except that di-iodo pyridines are not formed in the presence of a sulfonyl group.

In the past it has been possible to form the 5-chloro and 5-bromo pyrimidines, but the 5-iodopyrimidines have not been previously known. In the past it has been possible to form a few of the 3,5 di-iodopyridines by indirect methods. The present method is more convenient, cheaper and more efficient. It is also comparatively easy to form the 3,5 di-iodo compounds. The method of using mercuric acetate as set forth herein is new.

In the past certain mercuric compounds have been used in conjunction with certain substitutions but in general these have involved the use of mercuric oxide and have formed a mercuric intermediate in which the mercury is appended to carbon which is later reacted to give a substitution product. In my method however, infrared spectra and other means indicate that the intermediate which is formed has the mercury bonded by other than a mercury-carbon link.

Sulfonamides of pyridines and pyrimidines may be substituted by my method whereas they are not otherwise substitutable by iodine. Aminopyridines may be substituted by iodine in the 5 position by using iodine and alkali, but this reactivity is destroyed by the introduction of the sulfonyl group.

The 5-iodo compounds are of use in the synthesis of substances of therapeutic value. Certain antimalarials and other compounds may be most readily formed by the substitution of the 5 position by iodine, which compounds may be used as intermediates or which may be used per se, and which because of the high reactivity of the iodine, are more suitable as intermediates than are the other halogen compounds.

Following are certain examples of my invention:

Example 1

2-amino-5-iodopyrimidine

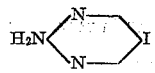

Twenty-three parts of 2-aminopyrimidine are dissolved in 200 parts of water at 70° C. to which are added 32 parts of powdered mercuric acetate. The mixture is thoroughly agitated for several minutes, and to the resulting slurry is added 51 parts of elemental iodine dissolved in 200 parts of boiling dioxane. After stirring for ½ hour while hot, the mixture is poured into an aqueous potassium iodide solution containing sufficient potassium iodide to dissolve all of the remaining iodine and mercury compounds (600 parts 15% potassium iodide solution). The material is filtered and the precipitate washed free of mercury salts with more potassium iodide solution. A yield of 67% of theoretical is obtained. After recrystallization from alcohol the 2-amino-5-iodopyrimidine melts at 223 to 224° C. (corr.).

Example 2

2-phenylsulfonamido-5-iodopyrimidine

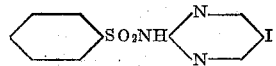

Forty parts of 2-phenylsulfonamidopyrimidine and 55 parts of mercuric acetate are mixed with 450 parts of glacial acetic acid. The mixture is heated to boiling and 48 parts of free elemental iodine is added thereto. The mixture is refluxed for 15 minutes and the product is precipitated out by adding it to 120 grams of potassium iodide in 700 cc. of water. The product is filtered and washed free of mercury salts. When recrystallized from acetic acid a 67% yield of 2-phenylsulfonamido-5-iodopyrimidine is obtained with a melting point of 255 to 256° C. (corr.).

Example 3

2-(3-nitrophenylsulfonamido)-5-iodopyrimidine

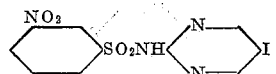

Thirty-six parts of elemental iodine is added to a boiling mixture of 28 parts of 2-(3-nitrophenyl-sulfonamido)-pyrimidine and 32 parts of mercuric acetate in 300 parts of glacial acetic acid. After standing for 45 minutes hot, the product is precipitated by addition to aqueous potassium iodide, filtered, washed free of mercury salts with potassium iodide solution, and recrystallized from glacial acetic acid, as previously described. A 67% yield is obtained of a product with a melting point of 255 to 257° C. (corr.).

*Example 4*

2-(N³-acetylmetanilamido)-5-iodopyrimidine

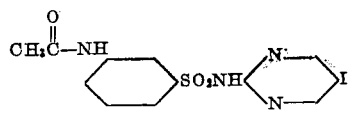

A mixture is prepared containing 29 parts of 2-N³-acetylmetanilamidopyrimidine and 32 parts of mercuric acetate in 250 parts of glacial acetic acid. To the boiling mixture is added 28 parts of iodine, the mixture is kept hot for 15 minutes, the product precipitated by addition to aqueous potassium iodide and washed free of mercury salts. When recrystallized from glacial acetic acid a 63% yield of the product is obtained which had a melting point of 272° C. (corr.)

*Example 5*

2-(N⁴-acetylsulfanilamido)-5-iodopyrimidine

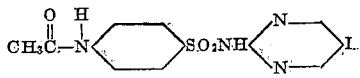

A solution is prepared containing 29 parts of 2-N⁴-acetylsulfanilamidopyrimidine and 28 parts of iodine in 250 parts of glacial acetic acid. To the refluxing solution is added 32 parts of powdered mercuric acetate, and the resulting slurry is maintained hot for about 15 minutes. The slurry is then added to a 15% aqueous potassium iodide solution, the product filtered, washed with potassium iodide solution, and recrystallized from acetic acid. A 50% yield of the desired product is obtained; M. P. 280° C. (corr.)

*Example 6*

2-(N⁴-acetylsulfanilamido)-5-iodopyridine

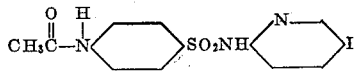

When 2-N⁴-acetylsulfanilamidopyridine is used as the starting material in the process set forth in Example 5, a 60% yield is obtained of the corresponding -5-iodo pyridine, which has a M. P. of 247° C. (corr.)

*Example 7*

2-(4-nitrophenylsulfonamido)-5-iodopyridine

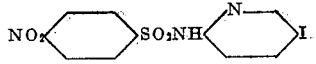

When 2-(4-nitrophenylsulfonamido)-pyridine is used instead of the pyrimidine in the process of Example 3, a yield of 85% of the corresponding -5-iodopyridine is obtained, which has a M. P. of 219° C. (corr.)

*Example 8*

2-amino-5-iodopyridine

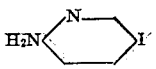

Twenty-three parts of 2-aminopyridine and 32 parts of mercuric acetate are mixed with 200 parts of water at 70° C. To this mixture is added 51 parts of elemental iodine dissolved in 200 parts of boiling dioxane, and the mixture stirred while hot for about ½ hour, then poured into 700 parts of 15% aqueous potassium iodide solution. The mixture is cooled below room temperature and extracted several times with ethylene dichloride in 150 part portions each. The combined extracts are washed twice with 200 part portions of potassium iodide solution, treated with decolorizing charcoal, and evaporated to dryness. The product is recrystallized from alcohol. A 60% yield of 2-amino-5-iodopyridine is obtained (M. P. 129° C.) (corr.)

*Example 9*

2-amino-3,5-di-iodopyridine

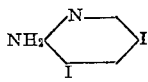

Twenty-three parts of 2-aminopyridine and 48 parts of mercuric acetate are mixed with 200 parts of water at 70° C., to which is added 102 parts of iodine dissolved in 400 parts of dioxane. The subsequent treatment is as set forth in Example 8. A 20% yield of 2-amino-3,5-di-iodopyridine is obtained (M. P. 147° C.) (corr.)

The usual methods which are used for iodinating the aryl amines, such as aniline and aminopyridine, namely iodine and an alkali such as sodium bicarbonate and sodium hydroxide, or iodine chloride, give poor yields with many pyridines and no appreciable yield with 2-aminopyrimidines. The use of mercuric acetate, as set forth in the above examples, greatly facilitates the substitution of iodine. In compounds such as those of Examples 4 and 5 above, the use of the mercuric acetate causes iodination of the pyrimidine ring. The normal methods of halogenation such as are used with the bromination or chlorination of these compounds give substitution in the benzene ring as well as in the heterocyclic ring, and, accordingly, an entirely different series of compounds.

Compounds such as 2-aminopyrimidine may have other substituent groups providing that these substituents are not more active towards iodine than the pyrimidine ring itself. Benzene, and substituted benzene, sulfonamidopyrimidines work well. If a sulfonyl group is present on the amido group, the use of mercuric acetate, in accordance with this invention, is the only practical method of iodination. The mechanism of the reaction is obscure. However, an intermediate is obtained, which may be isolated before the addition of the iodine, which is a mercury compound of unknown composition in which it appears, from infrared spectrographic data, that the mercury is attached by other than a conventional mercury to carbon bond.

Acetic acid appears to be a preferable solvent for use on the sulfonamido compounds. Where glacial acid is used as a solvent the mercury may be conveniently added in the form of mercuric oxide which of course forms the acetate in the solvent and of course other compounds which give mercuric acetate may be used. Dioxane and water are preferred as solvents for unsubstituted 2-aminopyrimidines and pyridines. Other solvents may be used in which the reactants may be dissolved and which do not themselves give undesired side reactions. Potassium iodide solution is preferred to remove the mercury salts and a 15% concentration is economical. A more dilute solution does not dissolve the residual mercury compounds as readily and more concentrated solutions use more potassium iodide. Sodium thiosulfate or other materials which will react with and solubilize the mercuric compounds formed in the reaction may also be used.

I claim as my invention:

1. The method of iodinating beta to all ring nitrogens a compound containing a nucleus of the group consisting of the 2-amino-pyridines and 2-amino-pyrimidines, said compound having no other ring substituents, which comprises heating said compound in the presence of mercuric acetate and elemental iodine in the presence of a solvent, then admixing with aqueous potassium iodide and recovering the iodinated compound.

2. The method of iodinating beta to all ring nitrogens a compound containing a nucleus of the group consisting of the 2-amino-pyridines and 2-amino pyrimidines, said compound having no other ring substituents, which comprises heating said compound in the presence of at least molar proportions of each of mercuric acetate and elemental iodine in the presence of an inert solvent and recovering the iodinated compound.

3. The method of preparing compounds containing a 5-iodo-pyrimidine nucleus which comprises heating the corresponding unsubstituted compound in the presence of acetic acid, mercuric acetate and iodine, to at least 70° C., subsequent treatment with aqueous potassium iodide, and recovery of the iodinated compound.

4. The method of preparing a 2-amino-5-iodopyrimidine which comprises heating the corresponding 2-amino pyrimidine compound in the presence of mercuric acetate and elemental iodine in the presence of a solvent, then admixing with aqueous potassium iodide, and recovering the said 2-amino-5-iodopyrimidine.

5. The method of preparing compounds containing a 5-iodo-pyridine nucleus which comprises heating the corresponding unsubstituted compound in the presence of acetic acid, mercuric acetate and iodine, to at least 70° C., subsequent treatment with aqueous potassium iodide, and recovery of the iodinated compound.

6. The method of preparing a 2-amino-5-iodopyridine which comprises heating the corresponding 2-amino pyridine compound in the presence of mercuric acetate and elemental iodine in the presence of a solvent, then admixing with aqueous potassium iodide, and recovering the said 2-amino-5-iodo-pyridine.

ROBERT GORDON SHEPHERD.

REFERENCES CITED

The following references are of record in the file of this patent:

FOREIGN PATENTS

| Number | Country | Date |
|---|---|---|
| 526,803 | Germany | December 1926 |
| 555,865 | Great Britain | Sept. 10, 1943 |

OTHER REFERENCES

Northey: Chem. Reviews, vol. 27, page 105 (1940).

Blatt, Organic Synthesis Collective Volume 2 (1943) John Wiley, pages 357–358 and page 351.

English J. A. C. S. 68 (March 1946) pages 453–458.